Oct. 27, 1931. J. S. LACH 1,829,045
INTERNAL RADIAL MULTIPLE SPINDLE DRILLING MACHINE
Filed Feb. 1, 1929 4 Sheets-Sheet 3

INVENTOR
Joseph S. Lach, by
Harry R. Williams,
atty.

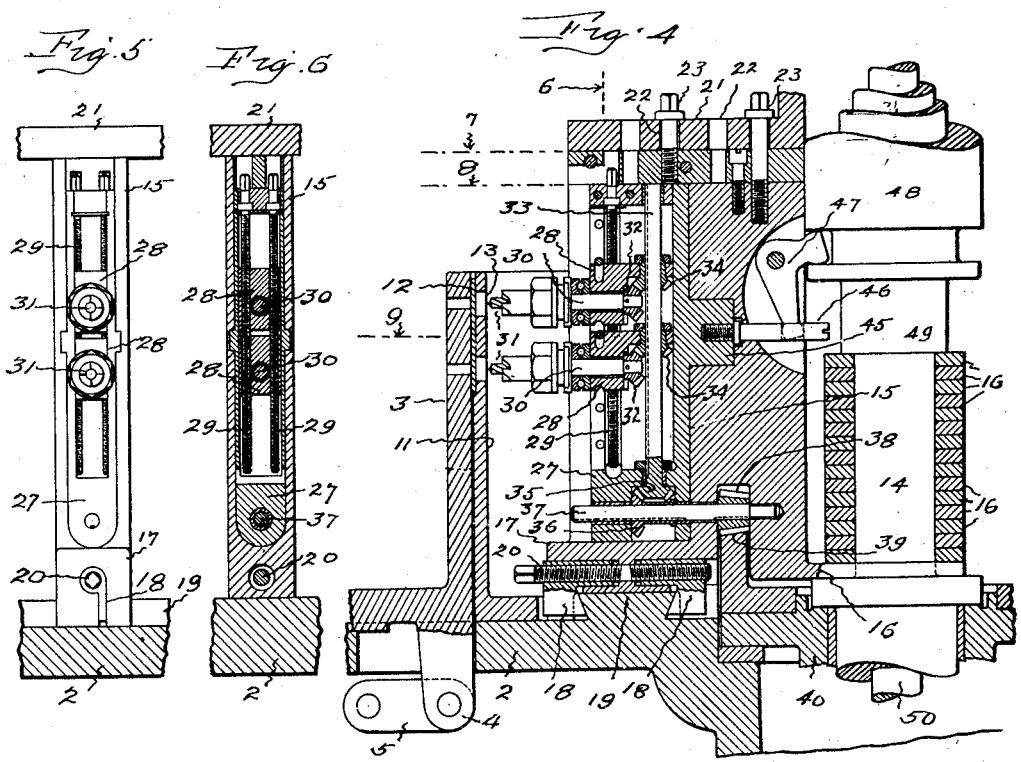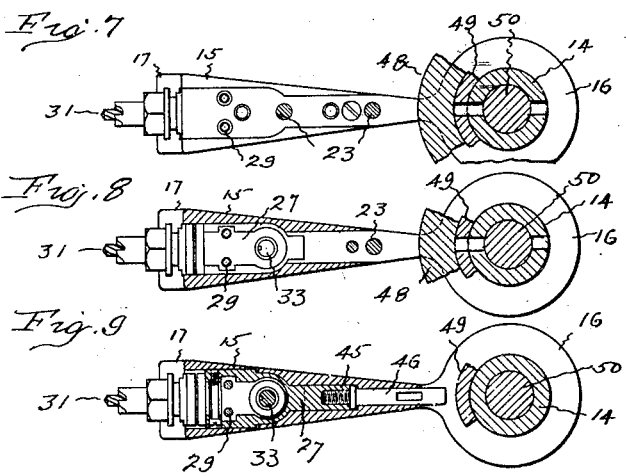

Patented Oct. 27, 1931

1,829,045

UNITED STATES PATENT OFFICE

JOSEPH S. LACH, OF BRIDGEPORT, CONNECTICUT

INTERNAL RADIAL MULTIPLE SPINDLE DRILLING MACHINE

Application filed February 1, 1929. Serial No. 336,861.

This invention relates to a drilling machine which has a plurality of tool spindles adapted to receive drilling, counter-boring, counter-sinking, reaming, tapping and the like tools, or any combination of these tools, for operating outwardly from a common central axis upon arcuate or annular pieces of work.

The object of the present invention is to provide a machine having a plurality of rotatory and reciprocatory tool carrying spindles that are arranged to be fed simultaneously in one or a plurality of rows, from the inside outward toward the curved work, and that are independently adjustable both angularly with relation to the axis of the work and also parallel to the axis of the work, whereby a large number of holes may be coincidentally made in a curved piece of work and the distance between the rows of holes and the distance between the holes in the row may be varied according to the required positions of the holes in the particular piece of work to be pierced.

The machine which is illustrated as embodying the invention has a base with a table on which are clamps for holding the work. Extending vertically from the table is a tubular column and pivotally supported by and movable about the column are a plurality of independent angularly adjustable heads. In each head is a housing that is movable radially in and out, and in each housing are a plurality of spindle carrying blocks that are independently adjustable up and down in the housing, so that the tool spindles may be adjusted angularly with the heads, adjusted vertically in the housings, and moved radially in and out with the housings.

The table supports means for rotating and for feeding all of the tool spindles simultaneously without interfering with their adjustment, which feeding of the tool spindles may be accomplished by hand or automatically.

Figure 1:
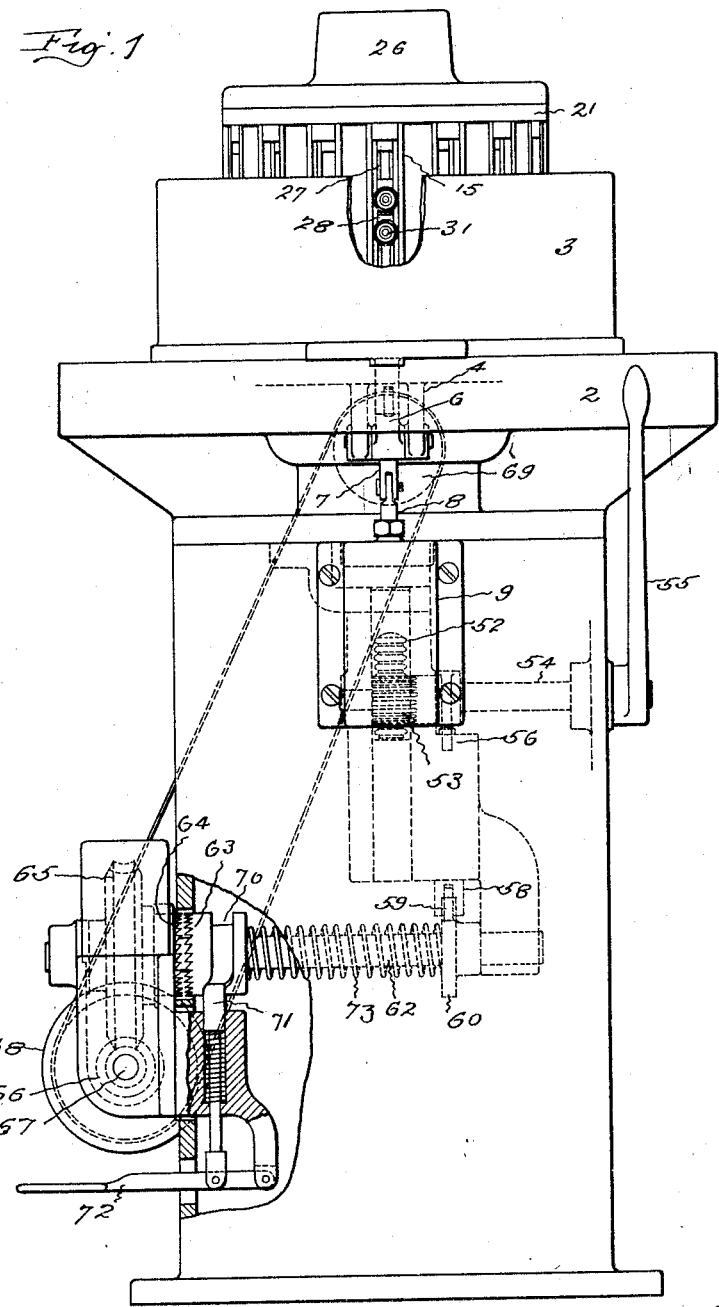
Figure 2:
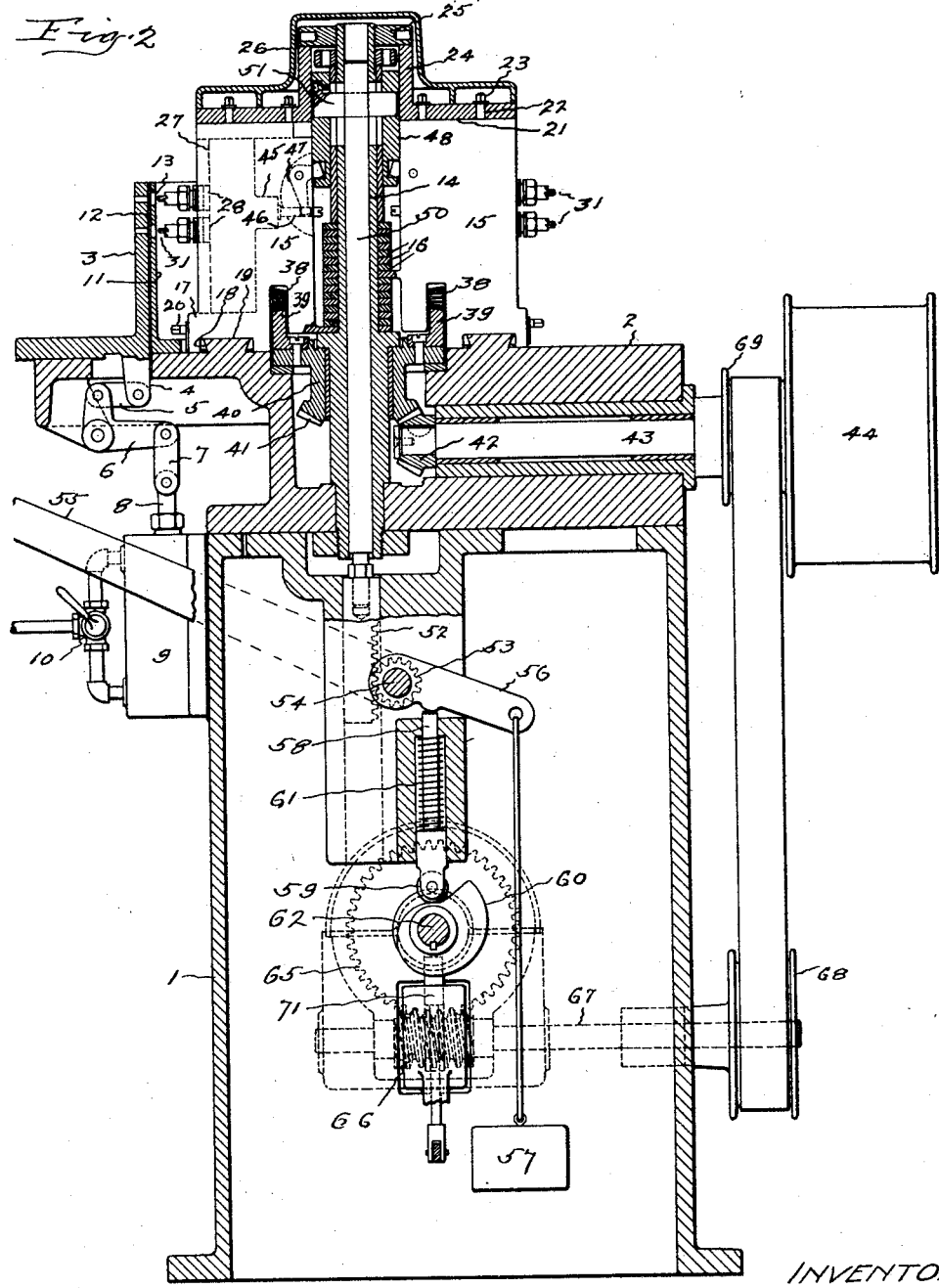
Figure 3:
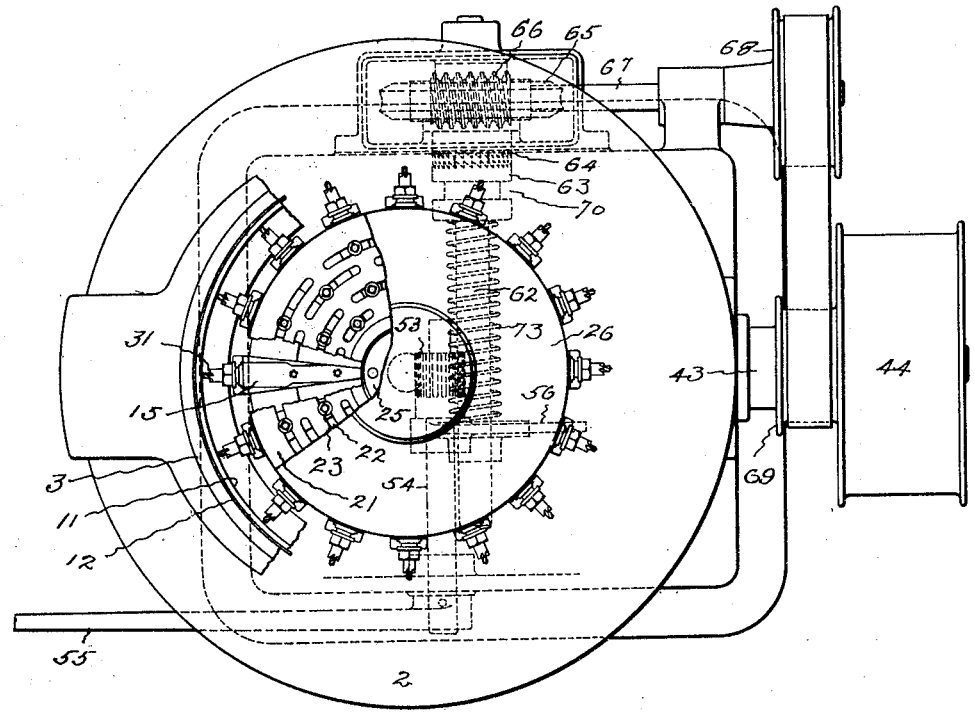

In the accompanying drawings Fig. 1 shows a front elevation of a machine which embodies the invention, small sections of the work holding clamp and base being broken away. Fig. 2 is a vertical section of the machine. Fig. 3 shows a plan of the machine with a portion of the top broken away to expose a spindle carrying head. Fig. 4 is a vertical section on larger scale of one of the heads. Fig. 5 is a front view of one of the heads. Fig. 6 is a vertical section of a head. Fig. 7 is a top view of a head looking down from the plane indicated by the dotted line 7 on Fig. 4. Fig. 8 is a section of a head on the plane of dotted line 8 on Fig. 4. Fig. 9 is a section of a head on plane indicated by dotted line 9 on Fig. 4.

The machine illustrated has a base 1 mounted on which is a circular table 2. Movable radially, by any suitable means, on the top of the table are one or more arcuate work holding clamps 3. The clamp shown has ears 4 that extend downward through a slot in the table, and these ears are connected by a link 5 with an angle lever 6 which is connected by a link 7 with a piston rod 8 in a cylinder 9 attached to the side of the base, Fig. 2. This cylinder may be connected with a source of pneumatic or hydraulic pressure so that by manipulating the 3-way cock 10 the clamp may be moved inward for clamping a piece of work to be operated upon, or moved outward for releasing a piece of work that has been operated upon. Attached to the top of the table inside of the clamp is an upright circular member 11 against which the work 12 may be held by the clamp. This member has perforations 13 which may be utilized as guides for the tools when they are fed to the work.

A tubular column 14 extends upward from the center of the table. Adjustable angularly about this column are a plurality of heads 15. Each head has an inwardly extending arm 16 with a perforation which fits the column so that the head may be oscillated from side to side with the column as a center. Each head also has an outwardly extending foot 17 with a dove-tail groove and clamping members 18 on its underside. Fitting this groove is a curved dove-tail guiding tenon 19 on the upper face of the table. After the head has been angularly adjusted about the column to the desired position it is secured by turning the screw 20 that is threaded through the clamping members.

Encircling the upper end of the column is a circular plate 21 that covers the upper ends of the heads. This cover plate has a number of grooved slots 22, Fig. 3, through which bolts 23 pass into the heads, Fig. 4. These bolts are loose when the heads are adjusted and when the heads are located in the required positions are tightened so as to rigidly hold the upper ends of the heads. The cover plate has an upwardly extending circular flange 24 upon which rests a collar 25 that is screwed upon and supports the upper end of the column, Fig. 2. A cap 26 is placed over the cover plate to enclose it and the upper end of the column.

Supported by each head and adjustable therein radially of the column is a spindle housing 27. Mounted in each housing and adjustable vertically therein are blocks 28. These blocks are independently adjustable up and down in the housing by means of screws 29, one screw being threaded into one block and the other screw into the other block, Fig. 6. Each of these blocks carries a horizontal spindle 30 that at its outer end has suitable means for holding the drill or other tool 31. At its inner end each tool spindle has a bevel gear 32. In the housing is a vertical shaft 33 and splined on this shaft are bevel gears 34 which are carried by the spindle blocks and which mesh with the gears 32 on the spindle, so that the tool spindles will be rotated from the vertical shaft regardless of the vertical positions to which they are adjusted, Fig. 4.

At the lower end of each vertical shaft 33 is a bevel gear 35 that meshes with a bevel gear 36 which is carried by the housing and is splined on a horizontal shaft 37, so that these gears will remain in mesh regardless of the position in and out to which the housing is adjusted radially of the head. Fixed to the horizontal shaft 37 carried by each head is a bevel gear 38 that engages a circular rack or annular gear 39, Figs. 2, 4. This annular gear is fastened to a hub 40 which is free to turn on the column in an opening in the table. At the lower end of this hub is a bevel gear 41 engaged by bevel gear 42 on a horizontal shaft 43 that is provided with a driving pulley 44. By this means all of the tool spindles are rotated simultaneously regardless of the angular adjustments of the heads, the radial positions of the housings in the heads, and the vertical relations of the tool spindle blocks in the housings.

For reciprocating the tool spindles the housings 27 are movable out and in the heads 15 as above stated. Each housing has an ear 45 that extends into a socket in its head. Projecting inward from each of these ears, through each head is a slotted stud 46, Fig. 4. Projecting into the slot in each stud is the end of an angle lever 47 that is pivotally mounted in a recess in the head. The other end of this angle lever engages in a groove in a collar 48 that is movable up and down on a sleeve 49 on the column, Fig. 2. Extending through the column is a vertical shaft 50 that at its upper end is provided with a key 51 which projects from the shaft through slots in the column and sleeve and into the collar 48, Fig. 2, in such manner that the vertical reciprocations of the shaft, by means of the key and collar, oscillates the angle levers 47 and thus causes all the tool spindles to be reciprocated radially at the same time.

The lower end of the shaft 50 is fastened to a vertically movable rack 52 in the base. Engaging this rack is a pinion 53 on a shaft 54 that is supported by the base and that at its outer end is provided with a lever 55. By moving this lever up and down and turning the shaft and pinion, the rack reciprocates the vertical shaft and causes the tool spindles to be moved in and out.

A rocker arm 56 is fastened to the shaft 54 and a weight 57 is hung on the outer end of this rocker so as to normally hold the hand lever raised and the tool spindles retracted, Fig. 2.

For automatically feeding the tool spindles when desired the upper end of a plunger 58 is arranged to engage the underside of the rocker 56. The lower end of this plunger has a roll 59 that is held in engagement with a cam 60 by a spring 61, Fig. 2. This cam is fastened to a shaft 62 that has a clutch member 63 which is adapted to engage a clutch member 64 on the hub of a worm gear 65 that turns loosely on the shaft 62. This gear is engaged by a worm 66 on a shaft 67 that has a pulley 68 which is belted to a pulley 69 on the driving shaft. The clutch member 63 has a cam groove 70 normally projecting into which is a spring pressed pin 71. When this pin is withdrawn from the groove in the clutch member as by means of a treadle 72, Fig. 1, the spring 73 causes the clutch members to engage and the cam to be rotated so as to automatically feed the tool spindles. If the treadle is held depressed the tool spindles will be fed continuously in and out, but if the treadle is released the pin engages the cam shaped groove and at the end of one revolution the clutch members become disengaged and the automatic feed of the spindles stops.

All of the tool spindles of this machine may be fed outward from a common center by hand, or they may be given a single feed by the automatic mechanism, or the automatic mechanism may be held so that the feeds will continue. Any number of spindle carrying heads, within limits of the machine, may be employed and these heads may be adjusted angularly at any desired distance from each other depending upon the spacing of the holes to be made. By the employment of a plurality of spindles in each head the holes may be made in rows, and as result of the possible adjustments of the spindles in the heads, the distance between the rows of the holes may be changed, or the holes may be staggered. The tools may be drills, reamers, counter-bores, counter-sinks or taps or any combination of these, and they may be applied to such of the spindles as the work requires. If a hole is not to be made at any particular locality a tool may be omitted from the spindle at that locality.

With this machine a large number of holes may be simultaneously made in a curved or annular piece of work at any required locality. The machine is particularly adapted for boring such articles as brake linings, but it may be used for perforating many other curved or annular articles. As the tools work outward from a common axis the operating pressures are so balanced and the machine is so stabilized that very accurate work may be rapidly performed.

The invention claimed is:

1. A multiple spindle drilling machine having a table, means on said table for holding a curved piece of work, a central supporting column extending upward from the table, a plurality of heads having arms pivotally mounted on said column and independently angularly adjustable about the axis thereof, a housing carried by each head and movable radially of the axis of the column, a block carried by each housing and adjustable parallel with the axis of the column, a tool spindle mounted in each block, common mechanism for reciprocating said spindles, and common mechanism for rotating said spindles.

2. A multiple spindle drilling machine having a table, means on said table for holding a curved piece of work, a central supporting column extending upward from the table, a plurality of heads having arms pivotally mounted on said column and independently angularly adjustable about the axis thereof, a housing carried by each head and movable radially of the axis of the column, a plurality of blocks carried by each housing and independently adjustable therein parallel with the axis of the column, a tool spindle mounted in each block, common mechanism for radially moving said housings, and common mechanism for rotating the spindles.

3. A multiple spindle drilling machine having a table, means on said table for holding a curved piece of work, a central supporting column extending upward from the table, a plurality of heads having arms pivotally mounted on said column and independently angularly adjustable about the axis thereof, a housing mounted in each head and movable therein radially of the axis of the column, a plurality of blocks in each housing, means carried by the housings for adjusting said blocks therein parallel with the axis of the column, a tool spindle mounted in each block, common mechanism for radially moving said housings, and common mechanism for rotating said spindles.

4. A multiple spindle driving machine having a table, means on said table for holding a curved piece of work, a central supporting column extending upward from the table, a plurality of heads having arms pivotally mounted on said column and independently angularly adjustable about the axis thereof, a housing carried by each head and movable radially of the axis of the column, a block carried by each housing and adjustable parallel with the axis of the column, a tool spindle mounted in each block, common mechanism for rotating said spindles, a shaft movable up and down the column, and levers connecting said shaft with the housings whereby the reciprocations of said shaft move said housings, blocks and spindles radially of said column.

5. A multiple spindle drilling machine having a table, means on said table for holding a curved piece of work, a central supporting column extending upward from the table, a plurality of heads having arms pivotally mounted on said column and independently angularly adjustable about the axis thereof, a housing carried by each head and movable therein radially of the axis of the column, a plurality of blocks movable up and down each housing, screws carried by each housing and engaging the blocks for independently adjusting the blocks parallel with the axis of the column, a tool spindle mounted in each block, mechanism for reciprocating said spindles, and mechanism for rotating said spindles.

6. A multiple spindle drilling machine having a table, means on said table for holding a curved piece of work, a central supporting column extending upward from the table, heads having arms pivotally mounted on said column and independently angularly adjustable about the axis thereof, a housing carried by each head and movable radially of the axis of the column, a plurality of blocks carried by each housing and independently adjustable parallel with the axis of the column, a tool spindle mounted in each block, a gear fastened to each spindle, a rotatable shaft carried by each housing, and gears movable on each of said shafts and engaging the spindle gears.

7. A multiple spindle drilling machine having a table, means on said table for holding a curved piece of work, a central supporting column extending upward from the table, heads pivotally mounted on said column and angularly adjustable about the axis thereof, a plurality of tool spindles carried by each head and movable angularly therewith, means carried by the heads for independently adjusting the spindles parallel to the axis of the column, means carried by the heads for simultaneously rotating the spindles, a shaft extending through the column and movable up and down therein, and means engaged by said shaft for simultaneously reciprocating the spindles.

JOSEPH S. LACH.